(12) United States Patent
Garg et al.

(10) Patent No.: US 12,369,033 B2
(45) Date of Patent: *Jul. 22, 2025

(54) REMOTE ENFORCEMENT OF RULES ON MOBILE DEVICES

(71) Applicant: T-Mobile USA, Inc., Bellevue, WA (US)

(72) Inventors: Parag Garg, Woodinville, WA (US); Nicholas LaVassar, Issaquah, WA (US); Christopher Painter, Bellevue, WA (US); George MacDonald, Newcastle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,864

(22) Filed: Apr. 12, 2024

(65) Prior Publication Data

US 2024/0259813 A1 Aug. 1, 2024

Related U.S. Application Data

(63) Continuation of application No. 17/087,500, filed on Nov. 2, 2020, now Pat. No. 11,991,524.

(51) Int. Cl.
*H04W 12/37* (2021.01)
*H04W 4/02* (2018.01)
(Continued)

(52) U.S. Cl.
CPC ........... *H04W 12/37* (2021.01); *H04W 4/021* (2013.01); *H04W 4/023* (2013.01); *H04W 4/029* (2018.02); *H04W 4/50* (2018.02)

(58) Field of Classification Search
CPC ..... H04W 12/37; H04W 4/021; H04W 4/023; H04W 4/029; H04W 4/50; H04W 12/03; H04W 12/08; H04W 12/63; H04L 63/101
See application file for complete search history.

(56) References Cited

U.S. PATENT DOCUMENTS 9,264,412 B1 2/2016 Chao
10,984,123 B2 * 4/2021 Meng .................... H04L 9/3268
(Continued)

FOREIGN PATENT DOCUMENTS

JP 2010183414 A1 8/2010

OTHER PUBLICATIONS

U.S. Appl. No. 17/087,500, Office Action mailed Aug. 17, 2023, 26 pages.
(Continued)

*Primary Examiner* — Mohammad W Reza

(57) ABSTRACT

Described herein are techniques for enabling remote implementation and enforcement of usage settings on one or more user devices. In some embodiments, a wireless carrier network maintains information on relationships between various user devices. Each relationship may be active under specified conditions (e.g., time and/or location) and is associated with usage settings that dictate one or more rules to be enforced while the relationship is active. In some embodiments, a set of usage settings may be generated for a particular user device based on all active relationships associated with that user device. The set of usage settings may be enforced by a mobile application installed upon a user device or by a wireless carrier network that blocks certain network traffic to and/or from the user device.

18 Claims, 8 Drawing Sheets

(51) Int. Cl.
  *H04W 4/021* (2018.01)
  *H04W 4/029* (2018.01)
  *H04W 4/50* (2018.01)

(56) References Cited

U.S. PATENT DOCUMENTS

| | | |
|---|---|---|
| 11,991,524 B2 | 5/2024 | Parag |
| 2015/0223053 A1 | 8/2015 | Gillin, IV |
| 2015/0350220 A1 | 12/2015 | Espinosa et al. |
| 2019/0065585 A1 | 2/2019 | Goenka et al. |
| 2020/0356687 A1 | 11/2020 | Salzman et al. |
| 2020/0358765 A1 | 11/2020 | Olsen et al. |
| 2021/0329534 A1* | 10/2021 | Szrom ............ H04W 48/04 |
| 2022/0239756 A1* | 7/2022 | Keller ............ H04L 67/568 |

OTHER PUBLICATIONS

U.S. Appl. No. 17/087,500, Notice of Allowance mailed Jan. 10, 2024, 9 pages.

* cited by examiner

REMOTE ENFORCEMENT OF RULES ON MOBILE DEVICES

CROSS-REFERENCE TO RELATED APPLICATION

This application is a continuation of and claims priority under 35 U.S.C. § 120 to U.S. patent application Ser. No. 17/087,500 filed on Nov. 2, 2020, entitled "Remote Enforcement of Rules on Mobile Devices" by Parag Garg, et al., which is incorporated herein by reference in its entirety for all purposes.

BACKGROUND

As costs associated with mobile device production decrease, mobile device ownership continues to expand. Many parents have now provided mobile devices to their children for safety purposes when doing so in even the recent past would have been cost-prohibitive. However, while many parents' primary goal in providing their child with a mobile device is to ensure the child's security, current systems are not set up for authority figures having charge of multiple children.

Additionally, as most educators are aware, children having mobile devices can be disruptive to a learning environment.

SUMMARY

Techniques are provided herein for enabling remote implementation and enforcement of usage settings on one or more user devices. In some embodiments, a wireless carrier network maintains information on relationships between various user devices. Each relationship may be active under specified conditions and is associated with usage settings that dictate one or more rules to be enforced (e.g., functionality to be limited, etc.) while the relationship is active. In some embodiments, a set of usage settings may be generated for a particular user device based on all active relationships associated with that user device. The set of usage settings may be enforced by a mobile application installed upon a user device or by a wireless carrier network that blocks certain network traffic to and/or from the user device.

In one embodiment, a method is disclosed as being performed by a wireless carrier network, the method comprising identifying, with respect to a first user account, a set of relationships associated with a plurality of additional user accounts, the first user account associated with a first user device, identifying one or more user devices associated with each of the plurality of additional user accounts, determining one or more usage settings to be enforced with respect to the plurality of additional user accounts, receiving, from each of the one or more user devices, information related to a status of a user of the user device, and providing, to the first user device, a determination as to whether each of the one or more additional user accounts are in compliance with the one or more usage settings based on the received information.

In an embodiment, a method is disclosed as being performed by a wireless carrier network, the method comprising identifying a set of relationships stored in relation to a user account, determining a subset of active relationships from the set of relationships based on activation conditions associated with the set of relationships, identifying one or more user devices associated with the user account, generating, based on the subset of active relationships, one or more usage settings to be enforced in relation to the one or more user devices, and enforcing the one or more usage settings with respect to the one or more user devices.

An embodiment is directed to a computing device comprising: a processor; and a memory including instructions that, when executed with the processor, cause the computing device to, at least, identify a set of relationships stored in relation to a user account, determine a subset of active relationships from the set of relationships based on activation conditions associated with the set of relationships, identify one or more user devices associated with the user account, generate, based on the subset of active relationships, one or more usage settings to be enforced in relation to the one or more user devices, and enforce the one or more usage settings with respect to the one or more user devices.

Embodiments of the disclosure provide several advantages over conventional techniques. For example, the embodiments provide for the ability to quickly determine a status of multiple user devices at once. Where the embodiments are used with children/students, the embodiments can be used to ensure the security of those children/students by immediately identifying students that are not present or have wandered away. For example, in a field trip, a chaperone can quickly determine whether any of his or her charges have gone astray. In another example, in an emergency situation, an authority figure can quickly determine whether all of the children have made it to the emergency gathering place. Additionally, the embodiments allow for certain users (e.g., parents or teachers) to remotely restrict functionality of a user device that belongs to another user in an automated manner. This can advantageously allow games, text messaging, and other distracting applications to be disabled for a user that is in a learning environment in order to facilitate learning.

The foregoing, together with other features and embodiments will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
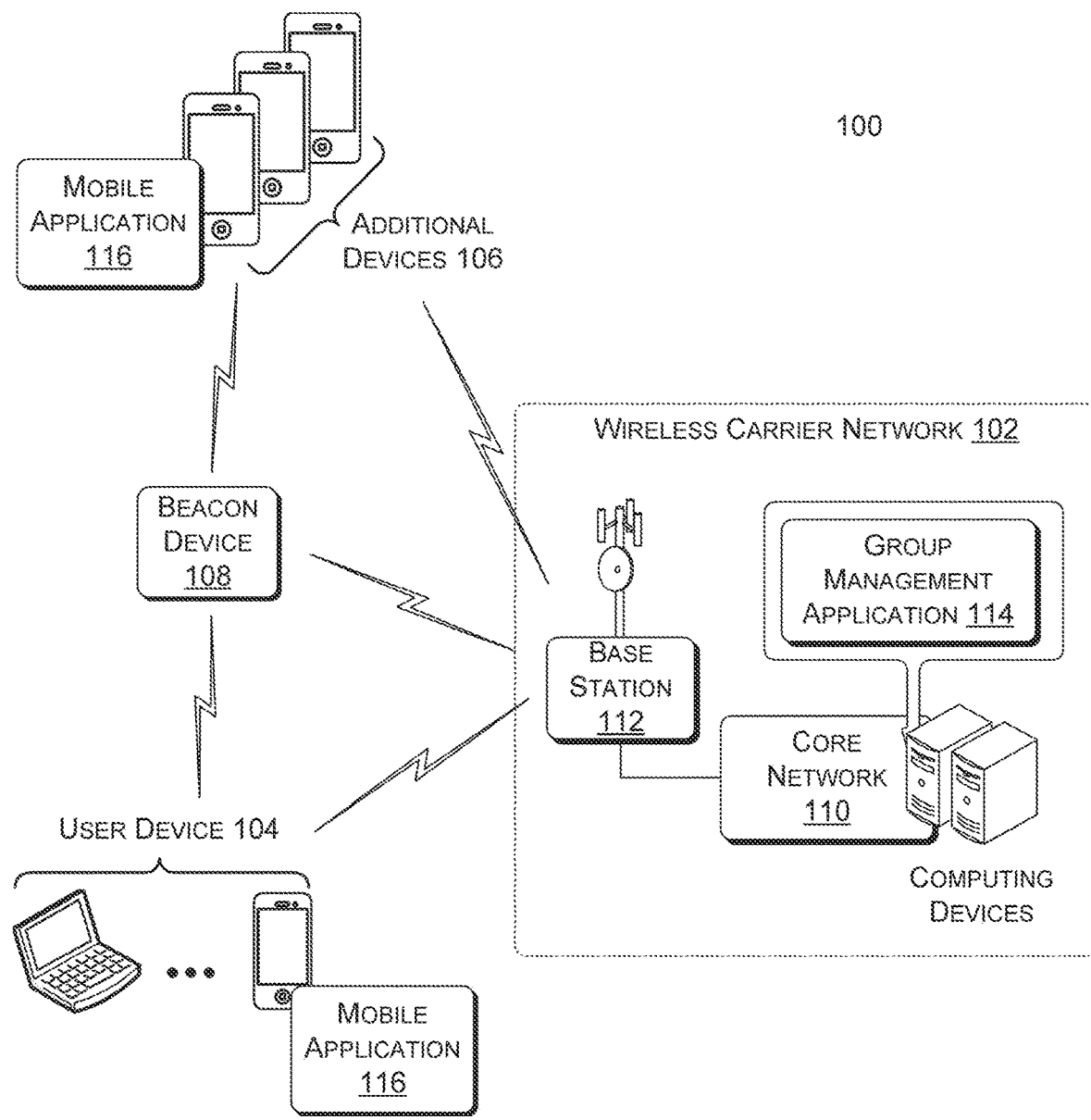
FIG. 1 illustrates an example architecture of a core network within a mobile telecommunication network for enabling various functionality on a user's mobile device in accordance with embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

This disclosure describes techniques that may be used to remotely enforce rules on a user device. Such rules (usage settings) may include restricting the use of certain functionality/software applications, requiring that the user device stay within, or outside of, a geographic area, or any other suitable restrictions. In some embodiments, relationships are maintained between various user accounts and/or user devices. Each relationship is active or becomes active under specific conditions (e.g., at particular times, locations, upon activation by a user, etc.). Usage settings associated with active relationships are combined into a set of usage settings to be implemented. Usage settings are then enforced either by the user device (e.g., via a mobile application installed upon the user device) or by a wireless carrier network (e.g., by disallowing/blocking certain network traffic).

In embodiments, the disclosure is directed to a system by which authority figures (e.g., teachers, parents, priests, etc.) are able to remotely set restrictions for multiple other users that are in their charge. Such restrictions not only allow the authority figures to restrict what the users can do on their user devices in an automated fashion, but also provide the ability to track whether the users are or are not within a specified geographic area so that their security can be ensured. Embodiments allow such tracking to be performed for a group of users simultaneously without the risk of forgetting one or more users that can result from human error.

By way of example, consider an instance in which a teacher is in charge of multiple students in a particular class. In this instance, the system may maintain a set of relationships between the teacher and each of the students. The teacher may set rules (e.g., usage settings) for each of the students in the class. As such, the system may automatically activate those rules during class time and only for the students that are presently in class. In this way, the teacher could restrict text messaging and other distracting activities from being performed while he or she is teaching. Additionally, the system may quickly identify (based on location information) which of the students are present (e.g., within some geographical area via geofencing) and which of the students are not present. If the class goes on a field trip, a mobile geographic area may be maintained such that the teacher can quickly determine a status of each of his or her students during the trip and whether any particular students are falling behind or leaving.

For the purposes of this disclosure, a relationship is a mapping between two user accounts and/or user devices that is maintained in a data store. The mapping may include assigned roles that defines the relationship. For example, a relationship may be categorized as a parent/child relationship in that one user device of the relationship is assigned a "parent" role and the other user device is assigned a "child" role. Each type of role may be assigned a priority that is used to determine a priority for which its rules are to be enforced. One or more activation conditions may be stored in association with each relationship. For example, a relationship may become active during a particular period of time (e.g., a one-hour block on specified days). In another example, a relationship may become active when one or both of the user devices in the relationship enters within a geographic area (e.g., a school ground). In another example, a relationship may become active when a user of one of the user devices in the relationship elects to activate the relationship. In some embodiments, a relationship may become active when multiple conditions are met. For example, a relationship may become active only during a specified period of time and if the user device is within a geographic area (e.g., the user device is on school grounds during school hours). Each relationship may be associated with usage settings provided by one of the user devices (e.g., the user device assigned the role with the highest priority) in the relationship.

For the purposes of this disclosure, usage settings are any set of rules to be implemented for a user device. Usage settings may be stored by the system in any suitable format. For example, usage settings may be stored as a text document in Extensible Markup Language (XML) format. In some embodiments, the usage settings may indicate what functions/applications are allowed on a user device (e.g., a whitelist) such that only those functions/applications may be executed while the usage setting is being enforced. In some embodiments, the usage settings may indicate what functions/applications are not allowed on a user device (e.g., a blacklist) such that those functions/applications may not be executed while the usage setting is being enforced, while other functions/applications can be executed. In some embodiments, usage settings may include an indication of a geographic area that the user device should remain inside or outside of. Such a geographic area may be defined via particular coordinates (or some distance from particular coordinates) or via some distance from another user device. Usage settings may indicate one or more actions to be taken upon violation of a particular rule. For example, if the user is not within a geographic area dictated by the usage setting, a notification may be provided to at least one user. In some embodiments, at least a portion of the usage settings may be transmitted to a user device and enforced by a mobile application installed upon that user device. In some embodiments, at least a portion of the usage settings may be enforced by a wireless carrier network in communication with the user device.

FIG. 1 illustrates an example architecture of a core network within a mobile telecommunication network for enabling various functionality on a user's mobile device in accordance with embodiments of the disclosure. The architecture 100 may include a wireless carrier network 102 that serves multiple user devices, such as a user device 104 as well as additional user devices 106. The user device 104 may be a feature phone, a smartphone, a tablet computer, a phablet, an embedded computer system, or any other device that is capable of using the wireless communication services that are provided by the wireless carrier network 102 to communicate with other electronic devices. In some embodiments, the architecture may include a beacon device 108 capable of communicating with one or more of the various user devices via a short-range communication technology as well as with the wireless carrier network via a long-range communication technology.

The wireless carrier network 102 may include a core network 110 and a radio access network. The radio access network may include multiple base stations, such as base station 112. Each of the base stations (e.g., base station 112) may provide a corresponding network cell that delivers telecommunication and data communication coverage. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The base stations are responsible for handling voice and data traffic between user devices (e.g., use device 104 and/or additional user devices 106) and the core network 110. In some embodiments, a base station (e.g., base station 112) may be in the form of an eNodeB node. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The core network 110 may be comprised of a number of computing devices and may provide telecommunication and data communication services to multiple user devices. For example, the core network 110 may connect the user devices to other telecommunication and data communication networks, such as a computing network (e.g., the Internet) and a public switched telephone network (PSTN). The core network 110 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 110 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as communication with backend servers in the core network 110.

The core network 110 may further include a group management application 114. The group management application 114 may be a software component that manages functionality for the user devices 104 and 106. For example, the group management application 114 may enable/disable functionality on one or more user devices 106. In some embodiments, the group management application 114 determines locations for each of a number of "additional" user devices 106 with respect to a beacon device 108 and ensures that each of the additional user devices 106 are within some predetermined distance from the beacon device 108. Each of the user devices 104 and 106 may be associated with a user and/or user account, and associations between various users/user accounts may be maintained by the core network 110 within a data repository. In some embodiments, the group management application 114 may be configured to provide an indication of statuses for each of the additional user devices 106 to the user device 104 based on an association between the additional user devices 106 and the user device 104. In some embodiments, the beacon device 108 may be mobile, such that a location of the beacon device 108 changes with respect to time. The group management application 114 may be configured to monitor a location of each of the beacon device 108 as well as the additional user devices 106.

In some embodiments, the group management application 114 may be further configured to cause one or more of the additional user devices 106 to enter a restricted mode. In some embodiments, the group management application 114 causes a particular additional user device 106 to enter the restricted mode upon determining that the additional user device has entered within a proximity (e.g., within some predetermined distance) of the beacon device 108. In some embodiments, a timing element may additionally be used by the group management application 114 to cause a user device to enter the restricted mode. For example, the group management application 114 may cause the additional user device 106 to enter the restricted mode upon determining that the additional user device has entered within a proximity of the beacon device 108 and that a current time is within some window of time during which functionality of the additional user device should be limited.

A user device (such as user device 104 or any of the additional user devices 106) is any electronic device that is capable of establishing a communication session with another user device. In some embodiments, the user device 104 may include in its memory a mobile application 116 that enables at least a portion of the functionality described herein. For example, a mobile application may cause a user device on which it is executed to enter into a restricted mode, in which at least some portion of the functionality of the user device is caused to be disabled. For example, upon determining that the user device should be placed into restricted mode, the mobile application 116 may cause certain software and/or hardware components to be deactivated. By way of illustration, the mobile application may cause a text-messaging application on the user device to be deactivated, such that text messages cannot be sent or received by the user device 104 while the restricted mode is active. In some embodiments, a restricted mode may cause some functionality of the user device to be partially deactivated. For example, a text messaging functionality of the user device may be partially deactivated such that the user device can be used to text message contacts within a specified set of contacts but is otherwise disabled.

Additionally, the mobile application 116 may cause the user device to report location information to the core network 110, which may use that location information in performing its described functions. For example, each user device may independently provide location data to the core network on a periodic basis (e.g., each minute, every two minutes, etc.). In this example, a current location of each user device may be compared to a current location of a beacon device to determine whether the corresponding user device is within some threshold distance of the beacon device. The core network 110 may then take some action based on the provided location information as described elsewhere.

In some embodiments, the architecture 100 includes a beacon device 108. The beacon device 108 may include any electronic device configured to transmit at least its location data to the core network 110. In some embodiments, the beacon device 108 is capable of detecting one or more user devices within its vicinity. In some embodiments, the beacon device 108 is capable of transmitting an identifier or code to one or more user devices in its vicinity via a short-range communication mechanism (e.g., BLUETOOTH®, WIFI®, etc.). Note that while the architecture 100 includes a depiction of a stand-alone beacon device 108, some embodiments may not include a beacon device 108 that is separate from the other components shown. For example, in some embodiments, the user device 104 may also act as a beacon device, in that it performs the functions described above in association with the beacon device 108 as well as the functions described above in association with the user device 104.

A number of interactions may occur between various components of the architecture 100 during a process in which various functionality may be enabled/disabled on certain user devices. In some embodiments, the user device 104 and the additional user devices 106 may be associated with accounts maintained by the core network 110 and may be enrolled in a service managed by the core network 110. A group management application 114 of the core network may create and store a relationship between the accounts. For example, in some embodiments, a first user may enroll with the core network and may register as being a teacher at a school. The first user may be associated with a user device 104 and/or a beacon device 108 (as noted above the beacon device 108 and the user device 104 may be the same device). Several other users may enroll with the core network and may register (or have registered on their behalf) as a student at the school. The group management application 114 may receive an indication that a set of the users registered as students at the school are in a class taught by the first user. In this example, a relationship between each of the set of the users and the first user may be created and stored. In some embodiments, the relationship may be further associated with dates and/or times. For example, the core network 110 may store an indication of a time at which the set of users have class with the first user. In some embodiments, the first user may set usage settings for the set of users that will be implemented during a restricted mode.

In some embodiments of interactions between the components of architecture 100, the group management application 114 may receive information (e.g., location information) for a number of user devices enrolled in services managed by the group management application 114. The group management application 114 may identify a relationship for each respective user device based on the stored relationship data. In some embodiments, such a relationship may be determined based on a time at which the determination is being made (e.g., is it within a period of time associated with the relationship). The group management application 114 may then determine a set of usage settings to be applied to the user device based on the determined relationships. The set of usage settings may then be implemented to restrict certain functionality of the user device, either by a mobile application 116 installed on the user device or by the core network 110.

In some embodiments of interactions between the components of architecture 100 and the group management application 114 may provide information to a user device 104 based on information received from the additional user devices 106. For example, the group management application 114 may upon detecting a relationship between two user devices (or between a user device and a beacon device), determine a geographical distance between those two devices. In some cases, if the geographical distance is greater than some threshold distance, the user device 104 may be provided a notification. Additionally, the user device 104 may be provided with an indication of a location of the other user device or a direction in which the other used device is located.

It is noteworthy that the connection between the user device 104 and the wireless carrier network 102 is a secure connection. The secure connection may be established via end-to-end encryption. In this example, the user device 104 may be configured to encrypt outgoing communications with a first key of an asymmetric key pair, and one or more components of the wireless carrier network 102 may be configured to decrypt the encrypted communication using the counterpart key of the asymmetric key pair.

Figure 2:
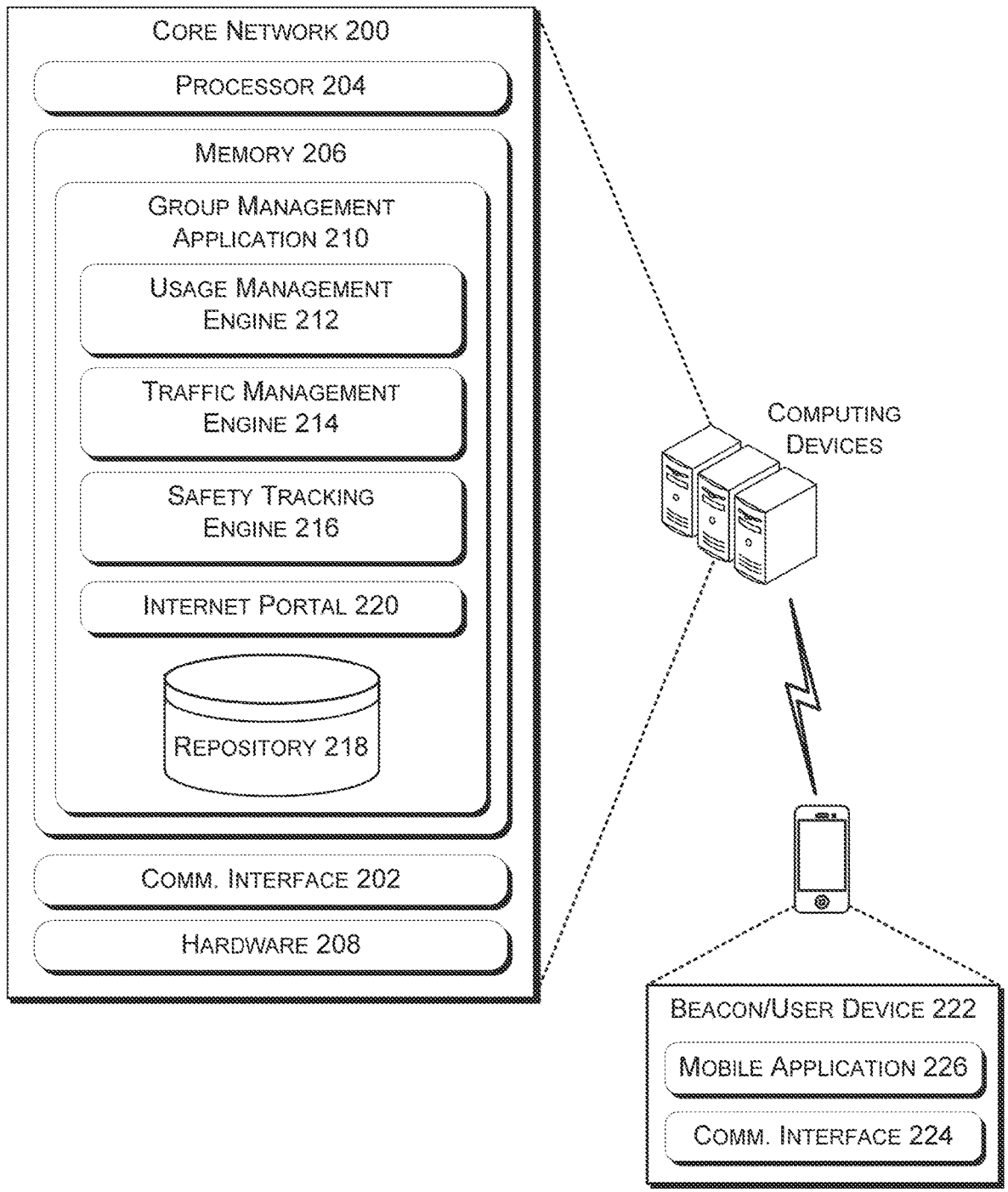
FIG. 2 is a block diagram showing various components of a computing system architecture that supports a mobile telecommunication network for implementing restricted mode and geographic grouping.

FIG. 2 is a block diagram showing various components of a computing system architecture that supports a mobile telecommunication network for implementing restricted mode and geographic grouping. The system architecture may include a core network 200 that comprises one or more computing devices. The core network 200 may include a communication interface 202, one or more processors 204, memory 206, and hardware 208. The communication interface 202 may include wireless and/or wired communication components that enable the core network 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The core network 200 can include any computing device configured to perform at least a portion of the operations described herein. The core network 200 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The core network 200 can include one or more virtual machines running virtual operating systems, or other computing architectures involving virtualization such as one or more flexible pools of logical storage devices that can be virtualized to maintain virtual storage devices for the computer. For example, the core network 200 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the core network 200 may implement functionality from a group management application 210 that includes one or more software modules and data stores. Such software modules may include routines, program instructions, objects, and/or data structures that are executed by the processors 204 to perform particular tasks or implement particular data types. The group management application 210 may include a usage management engine 212 that determines and manages relationships between various user devices, a traffic management engine 214 that enforces usage settings for one or more user devices, and a safety tracking engine 216 that detects a first user device that enters into or exits outside of a specified area and notifies a second user device. The data stores (data repository 218) may include a database of usage setting data that indicates one or more functions to be enabled/disabled with respect to a user device as well as relationship data that indicates relationships between various accounts/user devices.

The usage management engine 212 may be configured to, in conjunction with the processor 204, determine and manage relationships between various user devices. In some embodiments, this may comprise identifying one or more relationships stored in association with a specific user device. In some cases, the usage management engine 212 may identify only currently active relationships. For example, some relationships stored in a data repository with respect to a particular user device may be active at particular times indicated in the data repository. In this example, the usage management engine 212 may determine which relationships stored in association with the user device are active at a current time (the time at which the relationships are being determined) based on the particular times indicated in the data repository.

The usage management engine 212 may compile a set of usage settings for the user device based on the identified currently active relationships. In some cases, this may comprise determining, from the usage settings associated with currently active relationships, whether one or more conflicts exist between usage settings stored in relation to different currently active relationships. The usage management engine 212 may initially compile each of the non-conflicting usage settings associated with currently active relationships into the set of usage settings. The usage management engine 212 may then determine, for each of the conflicting usage settings, which relationship associated with a conflicting usage setting has the higher priority. The usage setting associated with that relationship may then be added to the set of usage settings. Once a set of usage settings has been generated by the usage management engine 212, that set of usage settings may be provided to the user device and/or the traffic management engine 214 to be implemented.

The traffic management engine 214 may be configured to, in conjunction with the processor 204, enforce usage settings for one or more user devices based on determined current relationships. In some cases, this may involve blocking certain types of network traffic routed to or from the user device. For example, upon determining that voice calls should be restricted in accordance with the usage settings, the traffic management engine 214 may reject requests received from the user device to complete a call and may route calls directed to the user device to a voicemail for that user device. In some cases, the traffic management engine 214 may block a subset of network traffic routed to or from the user device. For example, upon determining that only voice calls should be limited to calls between the user device and a parent user device (in accordance with the usage settings), the traffic management engine 214 may reject requests received from the user device to complete a call that is not directed to the parent user device and may route calls directed to the user device to a voicemail for that user device when the call does not originate with the parent user device. The traffic management engine 214 may block or allow traffic based on usage settings that include a whitelist (e.g., network traffic that is allowed) or a blacklist (e.g., network traffic that is disallowed). In the first case, the usage settings may indicate types of network traffic (either to or from the user device) that are currently allowed. In this case, any network traffic that is not included on the list is blocked. In the second case, the usage settings may indicate types of network traffic (either to or from the user device) that are currently not allowed. In this case, any network traffic that is included on the list is blocked.

The safety tracking engine 216 may be configured to, in conjunction with the processor 204, detect a first user device that exits outside of a specified area and notify a second user device of the status of the first user device. The safety tracking engine 216 may identify currently active relationships between a number of user devices. The core network 200 may receive information (e.g., location information, etc.) from each of these user devices either dynamically or on a periodic basis. Upon identifying a relationship between two user devices that relates to maintaining a distance between the two user devices, the safety tracking engine 216 may determine a current distance between the two user devices based on a current location for each of the user devices. The safety tracking engine 216 may then determine whether the distance between the two user devices is greater than some threshold distance. In some embodiments, the safety tracking engine 216 may provide a notification to at least one of the two user devices.

The core network may maintain a data repository 218 that stores associations between the various user devices based on the users associated with the respective user devices. For example, the data repository may store an indication that a particular additional user device is operated by a child of another user of a different user device. In another example, the data repository may store an indication that a user device is operated by a schoolteacher and that each a set of additional user devices are operated by students in the schoolteacher's class. Additionally, the data repository 218 may store usage settings that are set by users to be implemented on other user devices based on their relationship to those users. For example, a schoolteacher may indicate functions that may be enabled/disabled on user devices of students in his or her class during class time. In some embodiments, usage settings for some relationships may preempt usage settings for other relationships. For example, in the schoolteacher scenario above, usage settings stored in relation to a parent of a student may preempt, or take priority over, usage settings stored in relation to a teacher of the student.

In some embodiments, the core network 200 may include an Internet portal 220 that facilitates management of relationships between accounts. A user may access and/or edit information stored in relation to an account managed by the core network 200 on their behalf via the portal 220. The portal 220 may be accessed via a website maintained by the core network 200 (e.g., via a browser application) or by a mobile application installed upon the client device. In some embodiments, the user may be required to log into the account using login credentials (e.g., a username and password) associated with the account. Each account may be associated with a unique identifier, such as an account number, login identifier, name (e.g., first name and last name), phone number, etc. Once a user has accessed his or her account, the user may create a relationship between his or her account and another account. For example, the user may provide an identifier (e.g., a phone number) for another user for which such a relationship is to be created. A notification may then be provided to that user (or another user on his or her behalf) to confirm that the relationship should be created.

The user, when creating a relationship, may be required to select respective roles for each of the users in the relationship. By way of non-limiting example, some exemplary relationships may include parent/child, teacher/student, care provider/care providee, event host/event attendee, or any other suitable relationship. In some cases, roles may be selected by the user from a prepopulated list of roles (e.g., via a drop-down menu). Upon assigning a role to one of the users of the relationship, a corresponding role may automatically be assigned to the other user. As noted elsewhere, each role may be assigned a priority.

The user may provide an indication of activation conditions and usage settings to be associated with a relationship. In some cases, activation conditions and usage settings may only be set for a relationship by the user having the highest priority role in the relationship. In some embodiments, the activation conditions and usage settings may be selected from a set of available activation conditions and usage settings. For example, activation conditions and usage settings may be selected from a set of available activation conditions and/or usage settings. In some embodiments, particular types of activation conditions and usage settings may be required or made available or unavailable based on a role associated with the relationship. For example, a teacher/student relationship may require that activation conditions include a particular date/time at which the relationship is active. In some embodiments, activation conditions may be assigned using a calendar/schedule tool or other date/time selection mechanism. In some embodiments, one or more usage settings may be passive usage settings, in that they are not actively enforced. For example, a teacher/student relationship may by default, be associated with a passive distance threshold usage setting that enables automatic role call to be performed. For example, such a passive distance threshold usage setting may be used to quickly identify which students are present (within the distance threshold) and which students are absent (outside of the distance threshold) while not enforcing the distance threshold usage setting.

By way of illustrating the creation of one or more relationships, consider an exemplary scenario. In this scenario, a first user that is a teacher at a school may log into his account maintained by the core network and create a relationship to be associated with a class that he is going to begin teaching. To do this, the first user may select dates and times at which the relationship will be active as dates and times at which the class will be taught. The first user may also select rules to be applied during his class (e.g., no texting, voice calls, or video games). The first user may also provide a list of phone numbers for students enrolled in the upcoming class. In this scenario, a notification may be provided to each of the students enrolled in the class via his or her respective phone number. The user may have the option to approve the creation of the relationship via the provided notification. In some embodiments, the notification may be provided to a parent of the user instead. For example, the data repository 218 may include an active parent/child relationship in which the user is the child. Upon detecting the parent/child relationship, the notification may be provided to the parent instead, and the parent may approve the creation of the new relationship. In this scenario, separate teacher/student relationships may be created between the first user and each of the users indicated in the provided list of users (for which the creation of the relationship was approved).

As noted elsewhere, the core network 200 may be in communication with a number of beacons and/or user devices 222. Such a device 222 may be any electronic device capable of interacting with the core network 200 as described herein. The device 222 may include a processor and a computer readable memory as well as a communication interface 224. The computer readable memory of a user device 222 may include a mobile application 226 that enables interaction between the user device 222 and the core network 200. In some embodiments, execution of the mobile application 226 on the user device 222 may cause the user device 222 to instantiate a graphical user interface (GUI) associated with the mobile applications 226. In some embodiments, the mobile application 226 may execute as a background program on the user device 222.

The communication interface 224 may include wireless and/or wired communication components that enable the computing devices to transmit or receive data via a network, such as the Internet. In some embodiments, the communication interface 224 may include both short-range and long-range communication mechanisms. In some embodiments, communications between user devices and/or a beacon device may be established via a short-range communication mechanism of the communication interface 224 whereas communications between a user device (or beacon device) and the core network 200 may be established via a long-range communication mechanism.

The mobile application 226 may enable a user of the user device 222 to interact with the core network 200. For example, a communication session may be established between the core network 200 and the user device 222 via the respective communication interfaces 202 and 224. In some embodiments, the mobile application 226 may provide a user with access to functionality provided via one or more modules (e.g., the group management application 210) implemented on the core network 200. In some embodiments, the mobile application 226 may receive a set of usage settings from the core network and may implement those usage settings on the user device. For example, the mobile application 226 may receive an indication of one or more software applications that are to be restricted from being used. In this example, the mobile application 226 may cause the user device to exit out of, or shut down, any current instantiations of the one or more software applications. The mobile application 226 may then prevent execution of the one or more software applications until a new set of usage settings is received that allows the use of the one or more software applications.

In some embodiments, the mobile application 226 may present status updates (e.g., via a GUI) for one or more user devices having a relationship to the user device on which the mobile application 226 is executed. For example, a mobile application 226 executed on a user device may notify a user of that user device when a different user device having a relationship with that user device is more than some predetermined distance away from the user device.

Figure 3:
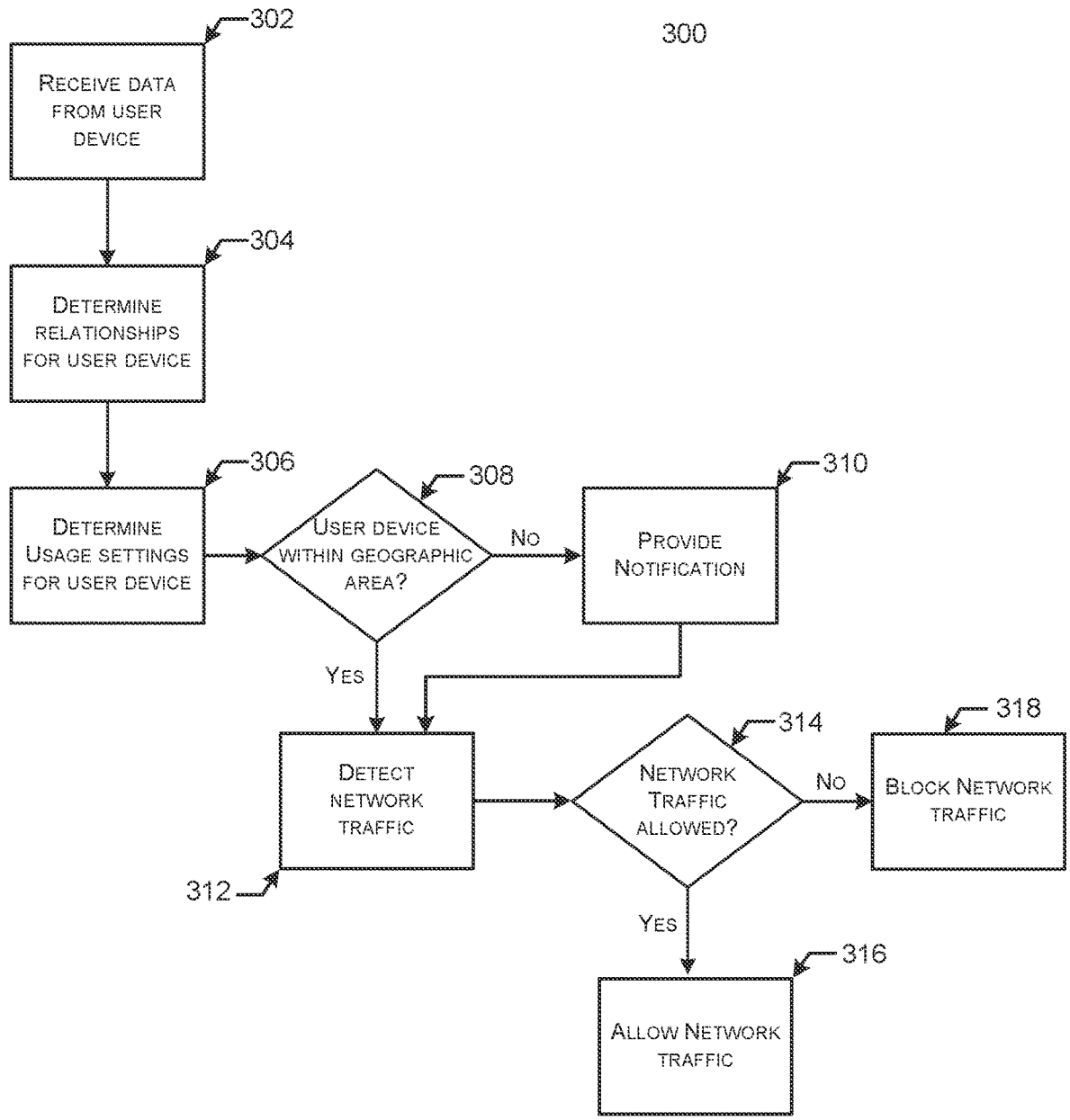
FIG. 3 depicts a block diagram showing an example process flow for managing relationships between various user devices in accordance with embodiments.

FIG. 3 depicts a block diagram showing an example process flow for managing relationships between various user devices in accordance with embodiments. The process 300 involves interactions between various components of the architecture 100 described with respect to FIG. 1. More particularly, the process 300 involves interactions between a user device 104, additional user devices 106, and a wireless carrier network 102.

At 302, the process 300 comprises receiving data from a user device. In some embodiments, the received data may include an indication of a current geographical location of the user device, an indication of one or more functionality activated on the user device, or any other suitable data. In some embodiments, the data is received on a periodic basis (e.g., every five minutes, etc.). In some embodiments, the data is received dynamically (e.g., as new data is generated) when actions are conducted on the user device.

At 304, the process 300 comprises determining relationships for the user device that are currently active. This may involve identifying relationships stored in a data store that relate to the user device and filtering out any of the identified relationships that are not active at a time that the relationships are determined. In some embodiments, relationships for a user device may be determined periodically. In some cases, at least some relationships stored in a data repository may be associated with a period of time. In these cases, the process 300 may identify relationships that are about to become active based on the period of time associated with those relationships. The process 300 may then determine a complete set of relationships for each of the user devices relevant to the relationship that is about to become active.

At 306, the process 300 comprises determining usage settings for the user device. In some embodiments, this involves first identifying each of the usage settings associated with the determined currently active relationships. The process then involves determining whether any of the usage settings conflict. If a conflict is determined to exist, the conflict may be resolved in favor of the relationship having a highest level of priority. Usage settings may then be generated as a set of all usage settings without determined conflicts plus a modified version of usage settings with conflicts that have been resolved.

By way of example, a usage setting associated with a first relationship between a user device 1 and a user device 2 may dictate that all calls should be blocked on user device 1 during a specified period of time. In this example, usage settings associated with a second relationship between user device 1 and user device 3 may dictate that calls between user device 1 and user device 3 must always be allowed. In this example, the process may determine that the operator of user device 3 is a parent or guardian of the operator of user device 1 and, as such, has the highest level of priority. Accordingly, a modified usage setting may be generated in which the user device 1 can only place and receive calls to user device 3 for the specified period of time.

In some embodiments, a usage setting may require that a user device be within some geographic area during a specified period of time. For example, a usage setting may require that a user device be on school grounds during a period of time associated with the school day. In another example, a usage setting may require that user device 1 must be within 500 feet of user device 2 for the duration of some period of time. In these embodiments, the process 300 comprises determining whether the user device is within the geographic boundaries dictated by the usage setting at 308. To do this, the process may compare a current location of the user device against the geographic area indicated in the usage setting to determine whether the user device is within, or outside of, the geographic area.

In some embodiments, the geographic boundary may be static, in that the geographic boundary relates to a particular area or region that is geographically fixed. In some embodiments, the geographic boundary may be movable. For example, the geographic boundary may be tied to a location of a beacon or another user device. In this example, the geographic boundary may be dictated as being some predetermined threshold distance (or multiple threshold distances) from the beacon or user device.

Upon determining that at least one usage setting requires that a user device be within some geographic area during a specified period of time, and upon determining that the user device is not currently within that geographic area ("No" from decision block 308), the process comprises providing a notification at 310. In some embodiments, a notification is generated and provided to one or more of the user devices associated with the relationship related to the usage setting. In some embodiments, the notification may indicate that the user device has exited, or is not within, the geographic area dictated by the usage setting. Upon determining that no usage setting requires that a user device be within some geographic area during a specified period of time, or upon determining that the user device is currently within a dictated geographic area ("Yes" from decision block 308), the process may continue to the next block.

At 312, the process 300 comprises detecting network traffic to and/or from the user device. In some embodiments, the process 300 may involve categorizing or otherwise assigning a type to the network traffic. In some embodiments, the system may determine a particular function or application associated with the network traffic.

At 314, the process 300 comprises determining whether the detected network traffic should be allowed. In some embodiments, this involves determining whether the network traffic is of a particular type or category that a usage setting indicates is either disallowed (e.g., blacklist) or allowed (e.g., whitelist). In some embodiments, this involves determining whether the network traffic is associated with a particular function or software application that a usage setting indicates is either disallowed or allowed.

Upon a determination being made that the network traffic is to be allowed ("Yes" from decision block 314) the process 300 comprises routing the network traffic to the appropriate entity at 316. At this step, network traffic directed toward the user device is transmitted to the user device whereas network traffic originating at the user device is routed to an appropriate entity.

Upon a determination being made that the network traffic is not to be allowed ("No" from decision block 314) the process 300 comprises blocking or preventing the network traffic from being transmitted. In some embodiments, transmission of network traffic to or from the user device that is disallowed is delayed until an end of the period of time in which the network traffic is disallowed. For example, text messages sent by the user device may be stored and transmitted once the period of time has expired. In this example, text messages sent to the user device may be conveyed to the user device once the period of time has expired. In some embodiments, network traffic may be blocked altogether. For example, text messages sent by the user device during a period of time in which they are disallowed may simply be blocked and an error message may be returned to the user device. In some embodiments, network traffic that is disallowed may be rerouted. For example, voice calls made to the user device may be rerouted to a voicemail associated with the user device.

Figure 4:
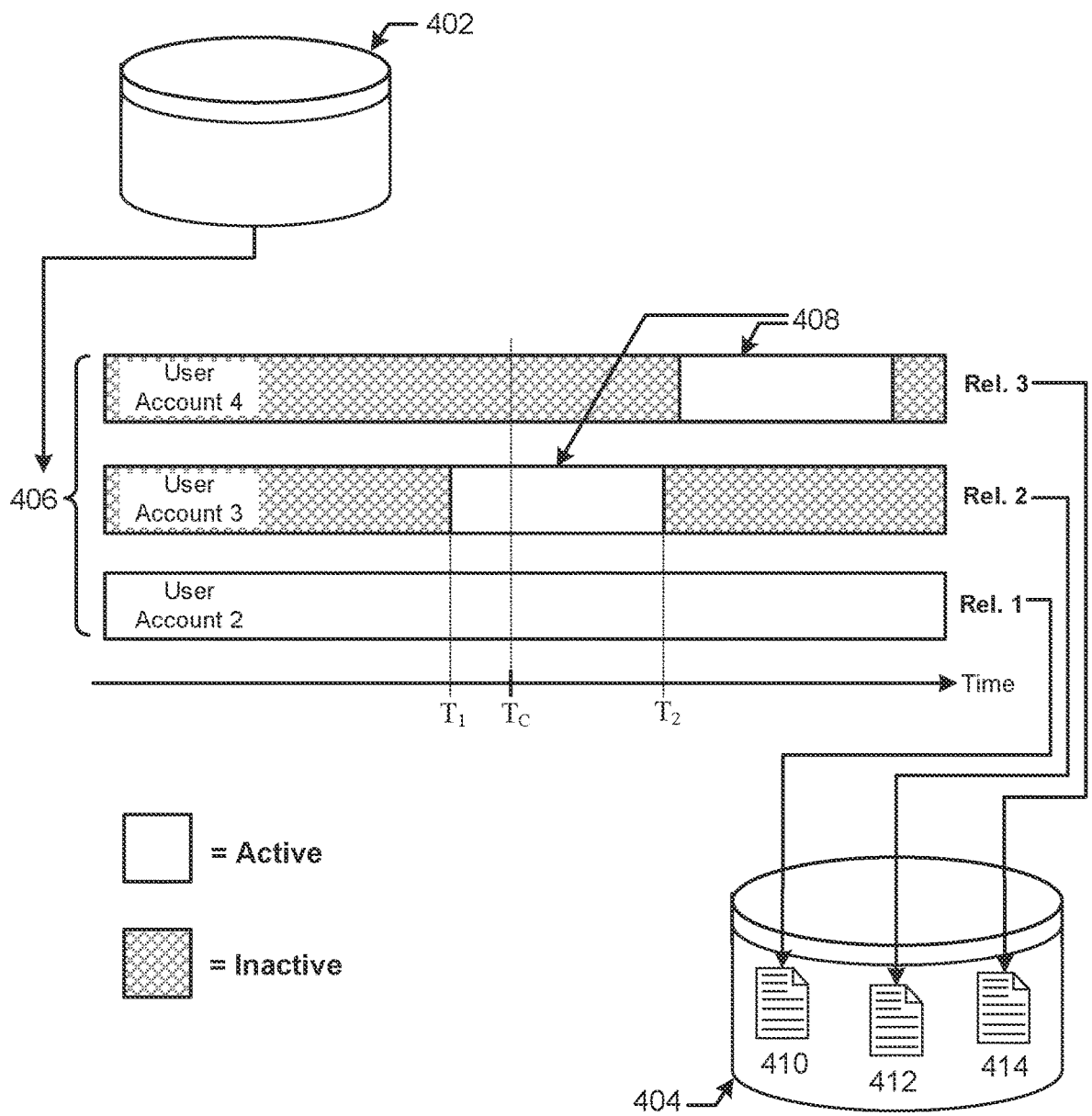
FIG. 4 depicts a block diagram showing an example of usage settings that can be generated for a user device based on identified relationships that involve that user device.

FIG. 4 depicts a block diagram showing an example of usage settings that can be generated for a user device based on identified relationships that involve that user device. As noted elsewhere, a core network of a wireless carrier network may maintain a data repository (e.g., data repository 218 of FIG. 2) that includes a variety of data. More particularly, such a data repository may include at least relationship data 402 that includes a mapping of relationships between various user accounts/user devices as well as a usage setting data 404 that includes a mapping of user accounts to usage settings.

In some embodiments, usage settings for a user account may be generated on a periodic basis. In some embodiments, usage settings for a user account may be generated upon determining, based on stored relationship data 402, that a relationship is about to enter (or has just entered) an active status. For example, a data store may be maintained that includes relationship data. Each "relationship" stored in such relationship data may indicate at least two user accounts/user devices relevant to the relationship, periods of time at which the relationship is active/inactive, as well as a role for each of the user accounts/user devices in the relationship.

In some embodiments, multiple relationships may be maintained for a single user account that may each be active over the same period of time. For example, the data store 402 may maintain, with respect to a user account associated with a teacher, separate relationships for each of the students that the teacher teaches, where each of those relationships are active during a period of time in which the teacher's class is being held. In this example, each of the separate relationships may have a role or teacher and student respectively. The teacher may set usage settings that should be applied while the relationships are active. It should be noted that a user account may be associated with multiple roles as well as multiple usage settings. For example, the teacher discussed above may also have children of his or her own. In this example, relationships may be maintained for the same user account of the teacher with user accounts for his/her children. In this example, the relationships would have a role of parent and child and the usage settings set by the parent may differ from those having the teacher role.

In order to generate a set of usage settings for a user account/user device, a set of relationships 406 may first be identified that relates to that user account/user device. For example, as depicted in FIG. 4, a set of relationships 406 may be identified to include separate relationships that relate user account 1 to each of user account 2, user account 3, and user account 4.

From the set of relationships 406, a subset of relationships may be determined to be active. In some embodiments, a relationship may be active at all times. For example, in the depiction, the relationship between user account 1 and user account 2 is depicted as always being active. In some embodiments, a relationship may be active only at specified periods of time 408. For example, in the depiction, the relationships between user account 1 and user account 3, as well as between user account 1 and user account 4, are each depicted as including a period of time 408 during which the relationship is active. In this example, the relationships are inactive during times that do not fall within the period of time 408 in which the relationship is active. By way of illustration, the relationship between user account 1 and user account 3 is depicted as being active between time $T_1$ and time $T_2$. In a scenario in which usage settings are being generated for a user device at a current time $T_C$ that falls between times $T_1$ and time $T_2$, the relationships between user account 1 and user account 3 and between user account 1 and user account 2 will both be considered active whereas the relationship between user account 1 and user account 4 will be considered inactive.

Once a subset of active relationships has been determined from the set of relationships 406, the subset may be mapped to usage settings. For example, each relationship of the set of relationships 406 may be mapped to a corresponding usage setting in usage setting data 404. In this example, the relationship between user account 1 and user account 2 is depicted as being mapped to usage setting 410, the relationship between user account 1 and user account 3 is depicted as being mapped to usage setting 412, and the relationship between user account 1 and user account 4 is depicted as being mapped to usage setting 414. The usage settings may be retrieved for each active relationship. In the illustrated scenario, usage settings 410 and 412 are retrieved by virtue of being associated with active relationships. The usage settings 410 and 412 may then be combined to generate a current set of usage settings for user account 1.

A usage setting associated with a relationship may include any suitable indication of functionality that can or cannot be accessed on a user device while the relationship is active. For example, the usage setting may indicate that voice calls cannot be placed or received on the user device while the relationship is active. Additionally, the usage setting may indicate that text messages cannot be sent or received on the user device while the relationship is active. The usage setting may also indicate that certain software applications or categories of software applications (e.g., games) cannot be executed on the user device while the relationship is active. On the other hand, the usage settings may also indicate certain functionality that is available while the relationship is active. For example, the usage settings may indicate an online resource (such as a webpage or online research tool) that may be accessed only while the relationship is active. In some embodiments, a usage setting may include an indication of one or more geographic boundaries that are relevant while the relationship is active. For example, the usage setting may include an indication that the two user devices associated with a particular relationship must remain within 500 feet of each other while the relationship is active.

To combine usage settings into a set of usage settings, a process may first identify all usage settings in the retrieved usage settings (e.g., usage settings 410 and 412) that have conflicts (e.g., contradictions). For example, a first usage setting that dictates no voice calls can be made contradicts a second usage setting that dictates that the user device must always be able to place calls to a particular user. Such usage settings would be considered to have conflicts. Once each usage setting is categorized as having or not having conflicts, each of the usage settings having no conflicts can be appended to the set of generated usage settings. Each of the identified conflicts in the remaining usage settings must then be resolved.

To resolve conflicts between usage settings, the process identifies a role associated with each of the active relationships. Various roles may have assigned a respective priority that is used to resolve such conflicts. For example, in the illustration, the relationship between user account 1 and user account 2 may be a parent/child relationship, such that user account 1 has a "child" role and user account 2 has a "parent" role. The relationship between user account 1 and user account 3 may be a teacher/student relationship, such that user account 1 has a "student" role and user account 2 has a "teacher" role. In this example, a "parent" role may be assigned a higher priority than a "teacher" role, such that usage settings for the relationship between user account 1 and user account 2 (e.g., usage settings 410) may preempt usage settings for the relationship between user account 1 and user account 3 (e.g., usage settings 412). In this example, the usage settings 412 may be implemented only to the extent that they do not conflict with the usage settings 410. For example, in the scenario that usage setting 412 dictates no voice calls can be made and usage setting 410 dictates that the user device must always be able to place calls to the parent (e.g., user account 2), the conflict may be resolved by creating a new usage setting in which only voice calls to the parent can be made. This new usage setting is then appended to the generated set of usage settings. In the case that there is no possible implementation of a usage setting that does not conflict with a usage setting associated with a higher priority, that usage setting would not be added. In this way, a current set of usage settings can be generated for a particular user account/user device.

In some embodiments, rather than being active during a particular period of time, one or more relationships may become active upon receiving an activation signal from one or the user devices in the relationship. For example, an operator of a first user device having a relationship with a second user device may choose to activate one or more usage settings via the first user device. In this example, the user may select an activation element (e.g., a button or other element) on a GUI presented on the first user device. Upon being activated, the now active usage settings may be used to generate the set of usage settings as described above.

Figure 5:
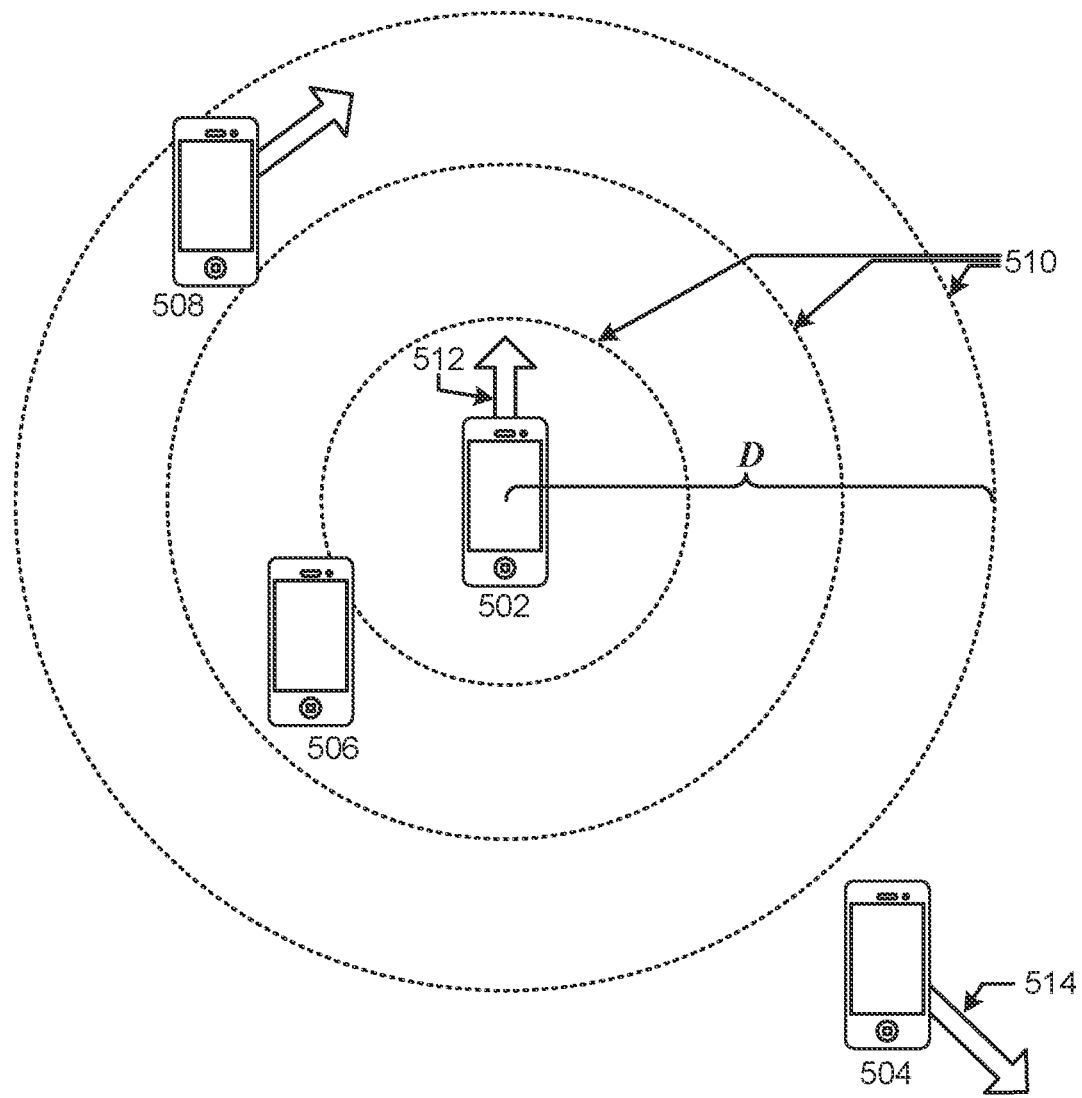
FIG. 5 depicts an illustration of techniques by which geographic boundaries may be enforced for one or more user devices based on usage settings in accordance with at least some embodiments.

FIG. 5 depicts an illustration of techniques by which geographic boundaries may be enforced for one or more user devices based on usage settings in accordance with at least some embodiments. As noted elsewhere, one or more usage settings implemented with respect to a user device may require that the user device remain within some geographic area. In some of these embodiments, the geographic area may be defined in terms of geographic distance from a user device (or beacon) 502. Note that for the purposes of the example described in FIG. 5, the user device 502 is also the beacon device, in that the user device 502 performs the functionality attributed to a beacon device throughout the disclosure.

In the scenario depicted in FIG. 5, a number of relationships may be maintained between user device 502 and various other user devices. Each of these relationships may be associated with usage settings that require the corresponding user device to remain within some distance of the user device 502. For example, in the depicted scenario, such relationships may be maintained between the user device 502 and user devices 504, 506, and 508.

In some embodiments, the geographic area may be defined by one or more distance thresholds 510, each of which is associated with a predetermined distance value (e.g., distance D). In these embodiments, a backend system may receive geographic location data from each of the user devices 502, 504, 506, and 508. The backend system may then determine a distance between user device 502 and each of user devices 504, 506, and 508. This distance information may then be compared to a distance threshold 510 to determine whether each of the respective user devices 504, 506, and 508 are in compliance with their respective usage settings.

In some embodiments, when a usage setting indicates multiple distance thresholds 510, each of those distance thresholds 510 may be associated with a different action to be taken if a user device is no longer in compliance with the respective distance threshold (e.g., a distance between the user device and user device 502 has exceeded the distance threshold). In some embodiments, different user devices may be associated with different distance thresholds 510. For example, user device 504 may be confined to a greater geographical area than user device 506.

In some embodiments, the geographic area may be defined by an availability of communication with the user device 502. For example, the user device 502 may establish communication with each of the respective user devices 504, 506, and 508 via a short-range communication channel (e.g., BLUETOOTH®). In this example, a distance between the user device 502 and each of the user devices 504, 506, and 508 may be determined based on a strength of a signal associated with the short-range communication channel. In some embodiments, a user device 504, 506, and/or 508 may be determined to not be in compliance with the geographical restrictions if the connection is broken or the signal is lost. In some embodiments, one or more of the user devices 504, 506, and/or 508 may transmit its current geographical location directly to the user device 502 via the short-range communication channel and a distance between the user devices may be determined based on that geographical location.

In some embodiments, a potential breach of the geographic boundary requirement may be predicted based on a velocity (direction and speed) 512 of the user device 502 and a velocity of one or more of the user devices required to remain within the geographic area (e.g., velocity 514). For example, the system may determine that, based on a current distance between user device 502 and user device 504, and based on a current velocity 512 and 514 of each of the respective user devices, that the distance between the devices will exceed some distance threshold D within some amount of time. In this example, one or more of the user devices 502 or 504 may be notified of the impending exceedance of the distance threshold. In some embodiments, one or more of the user devices 502 or 504 may be notified once the distance threshold has been exceeded.

By way of illustrating the techniques described in FIG. 5, consider the following scenario in which several user devices having a "student" role have a relationship with a single user device 502 in a "teacher" role. In such a scenario, the relationships may be active during a period of time associated with a class that the students have with the teacher. When the class period beings, the user device of the teacher is immediately presented with a list of students that are, or are not, present (e.g., within some distance of the teacher). Additionally, the teacher may be provided with an indication that certain missing students are on the way based on a speed and velocity of the student as well as a predicted arrival time. This allows the teacher to quickly perform an electronic role call to ensure the security of the students. Additionally, continuing with the above scenario, the teacher and students may attend a field trip or other activity in which the teacher and/or the students are mobile. The techniques described in relation to FIG. 5 allow the teacher to quickly determine where each student is as well as receive a notification when students are leaving the vicinity or not continuing on the trip, allowing the teacher to better ensure the security of the students.

Figure 6A:
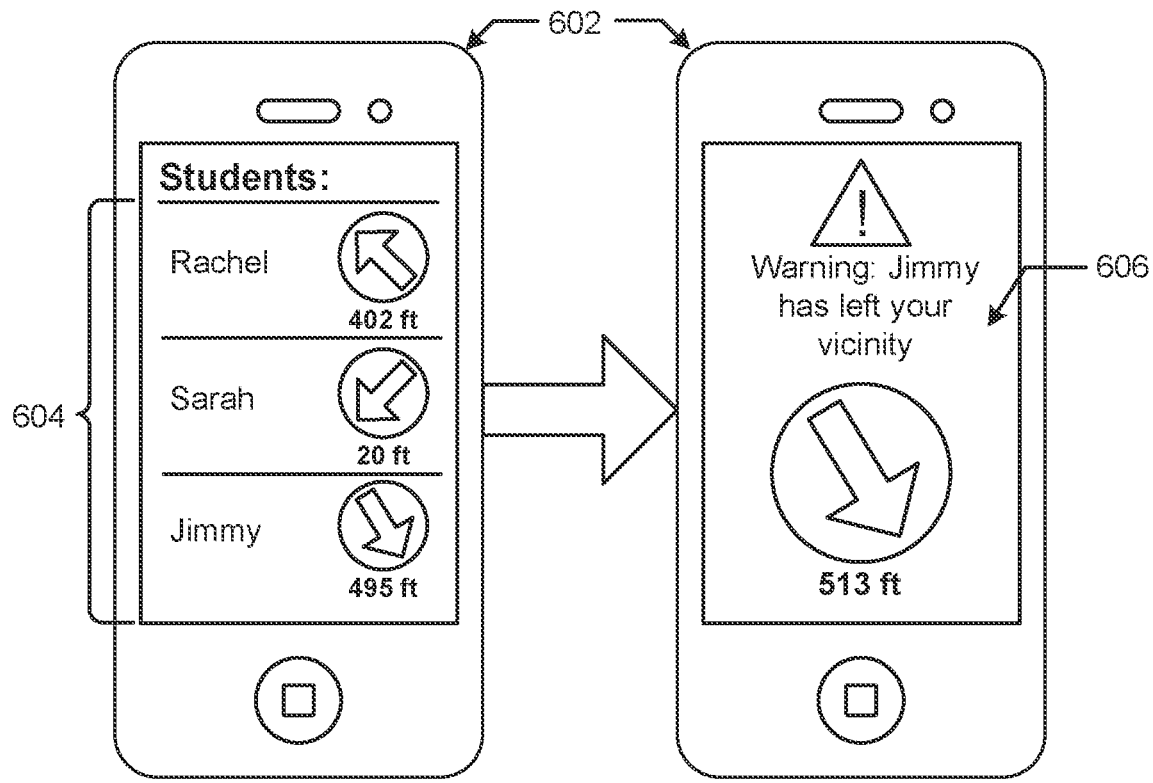
FIG. 6A depicts a first exemplary GUI that may be presented on a first user device to provide information about one or more user devices having a relationship with the first user device.
Figure 6B:
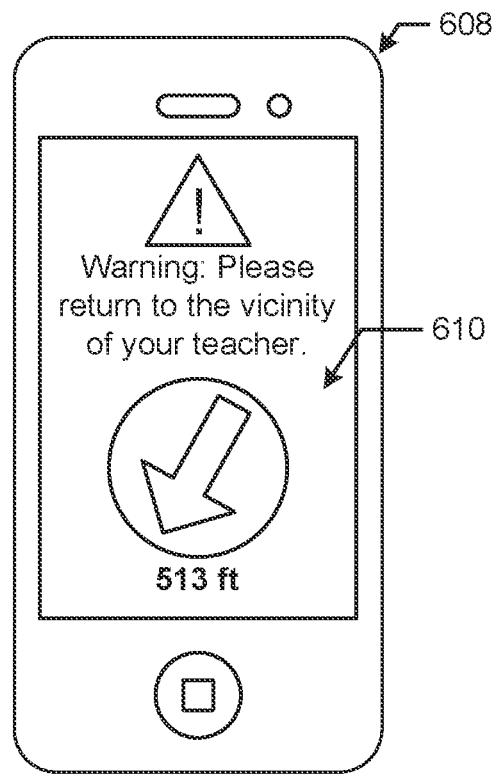
FIG. 6B depicts a second exemplary GUI that may be presented on a second user device to provide an indication that the second user device is not in compliance with one or more usage settings.

FIG. 6 depicts exemplary notifications that may be presented to one or more users via a graphical user interface (GUI) implemented in accordance with at least some embodiments. The GUI may be instantiated upon execution of a mobile application (e.g., mobile application 116 of FIG. 1) installed upon a user device. Each of FIG. 6A and FIG. 6B depict different aspects of such exemplary GUIs that may be implemented via such a mobile application installed on a user device.

FIG. 6A depicts a first exemplary GUI that may be presented on a first user device to provide information about one or more user devices having a relationship with the first user device. In some embodiments, the information may include an indication that a user device having a relationship with the first user device is not in compliance with one or more usage settings.

As depicted in FIG. 6A, the GUI of the mobile application may provide information related to a status of a number of accounts 604 that have a relationship with the user device 602. In some embodiments, the information for the number of accounts 604 may include a current location of a user device associated with each account. In some embodiments, the information for the number of accounts 604 may be accompanied by a button or other element that allows the operator of the user device 602 to remotely activate or deactivate one or more functions on a user device associated with each account. For example, the GUI may present a button that, when activated, causes multiple user devices to remotely enter a "school mode" in which various functions of those user devices are disabled.

In some embodiments, the GUI may present a notification 606 to the user of the user device 602 indicating that one or more user devices are not in compliance with a usage setting. For example, when a usage setting dictates that another user device must remain within some distance of the user device 602, a notification 606 may be presented if the user device exceeds that distance from the user device 602. In some embodiments, a notification 606 may be presented via the GUI that one or more of the number of accounts 604 is attempting to access a particular functionality of their user device. In these embodiments, the GUI may also present an option to allow the functionality to be accessed.

FIG. 6B depicts a second exemplary GUI that may be presented on a second user device to provide an indication that the second user device is not in compliance with one or more usage settings. In some embodiments, the second user device 608 may receive a notification 610 that the user device is not in compliance with the usage settings. For example, the user device may present a notification that the user device is outside of a geographic area that the user device is required to remain within. In another example, the user device may present a notification that the user device is inside of a geographic area that the user device is required to stay outside of. In some embodiments, the notification may include instructions on how to become compliant with the usage setting.

Figure 7:
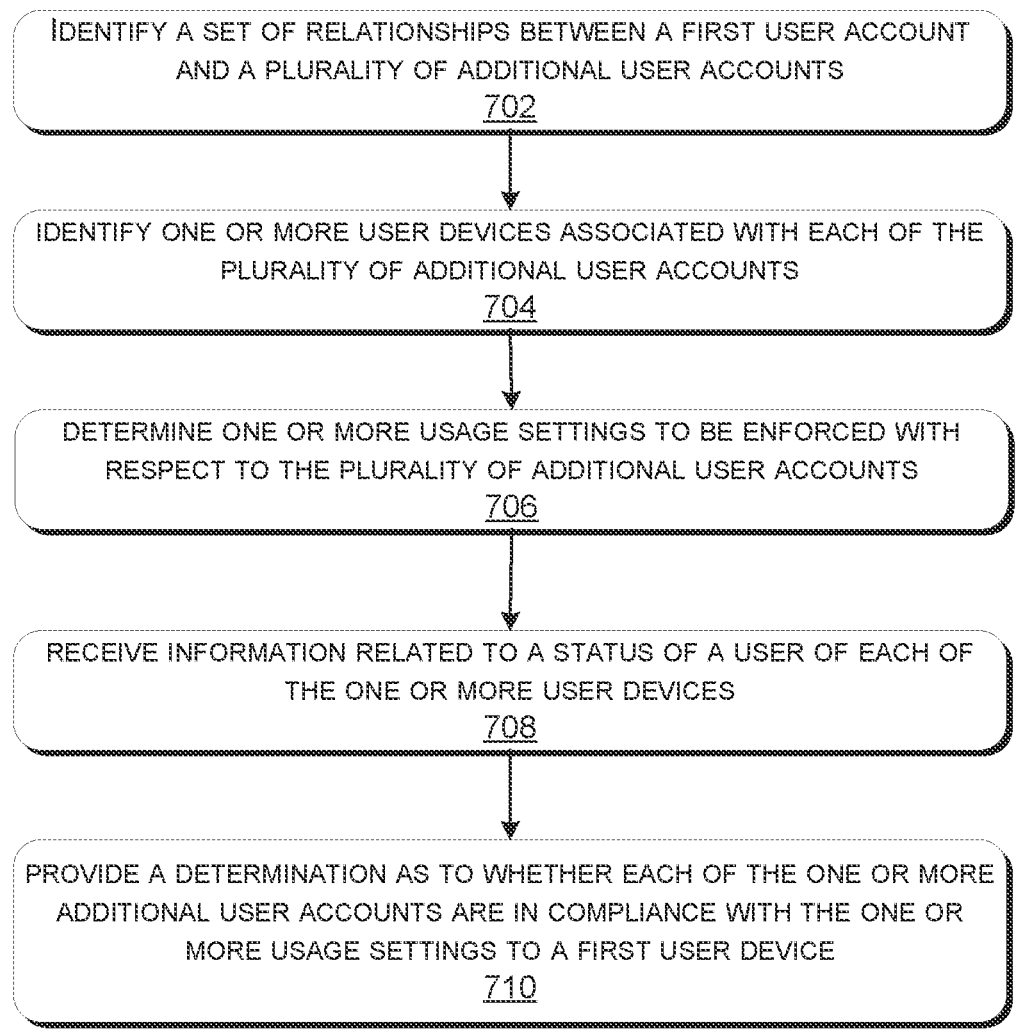
FIG. 7 depicts a block diagram showing an example process flow for determining compliance of a plurality of user devices with usage settings.

FIG. 7 depicts a block diagram showing an example process flow for determining compliance of a plurality of user devices with usage settings. In accordance with embodiments, the process 700 may be performed by components within a wireless carrier network, such as the core network 110 as discussed with respect to FIG. 1 above.

At 702, the process 700 comprises identifying, with respect to a first user account, a set of relationships associated with a plurality of additional user accounts, the first user account associated with a first user device. In some embodiments, the set of relationships are identified by virtue of being active, and the set of relationships are active when one or more activation conditions have been met. In some cases, the one or more activation conditions comprise a specified period of time. For example, where the first user account is associated with a teacher and each of the additional user accounts are associated with his or her students, the set of relationships may be active during a period of time in which the teacher is holding class for the students. In some case, the one or more activation conditions comprise receiving an activation request from the first user device. For example, an authority figure in charge of a plurality of other users may choose to activate the relationships upon making a determination that the usage settings should be enforced.

At 704, the process 700 comprises identifying one or more user devices associated with each of the plurality of additional user accounts. In some embodiments, each account may be associated with a set of user devices used by the owner of the account. In at least some of these embodiments, a subset of those user devices may be identified as being currently used by the owner of the account. For example, a subset of user devices may be determined by virtue of being in the vicinity of the first user device.

At 706, the process 700 comprises determining one or more usage settings to be enforced with respect to the plurality of additional user accounts. In some embodiments, the one or more usage settings comprise usage settings provided by the first user account. For example, an owner of the first account may create a number of usage settings at a time that the owner of the first account sets up the relationships in the set of relationships. For example, a teacher may create a set of usage settings to be applied to his or her class when enrolling members of the class.

At 708, the process 700 comprises receiving, from each of the one or more user devices, information related to a status of a user of the user device. In some embodiments, information related to the status of the user of the user device comprises information about a location of the user device. In some embodiments, the information related to a status of a user of the user device comprises information about applications and/or functions currently being activated by the user of the user device.

At 710, the process 700 comprises providing, to the first user device, a determination as to whether each of the one or more additional user accounts are in compliance with the one or more usage settings based on the received information. In some embodiments, the one or more usage settings comprises a geographic area and the information related to the status of the user of the user device comprises information about a location of the user device, such that the determination as to whether a user accounts is in compliance with the one or more usage settings is made based on whether the location of the user device is within the geographic area. In some embodiments, the process 700 may further comprise providing, to the first user device, at least a portion of the information related to the status of the user of the user device. For example, the first user device may be provided with a location, speed, and/or direction of the other user devices.

Figure 8:
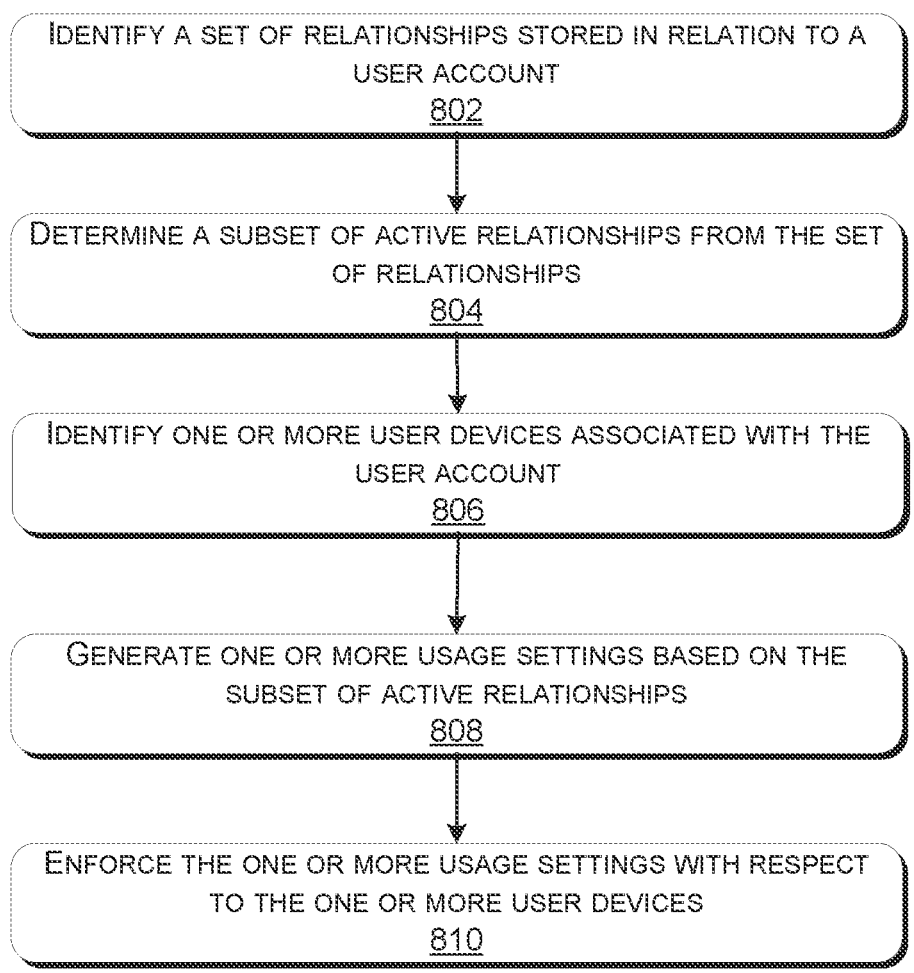
FIG. 8 depicts a block diagram showing an example process flow for determining and enforcing usage settings with respect to a user device.

FIG. 8 depicts a block diagram showing an example process flow for determining and enforcing usage settings with respect to a user device. In accordance with embodiments, the process 800 may be performed by components within a wireless carrier network, such as the core network 110 as discussed with respect to FIG. 1 above.

At 802, the process 800 comprises identifying a set of relationships stored in relation to a user account. In some embodiments, each relationship in the set of relationships is associated with the user account and at least one additional user account. In some cases, each of the user account and the at least one additional user account are assigned a role in each relationship of the set of relationships.

At 804, the process 800 comprises determining a subset of active relationships from the set of relationships based on activation conditions associated with the set of relationships. In some embodiments, each relationship is associated with activation conditions, such that the relationship is considered to be an active relationship when each of the activation conditions have been met.

At 806, the process 800 comprises identifying one or more user devices associated with the user account. In some embodiments, a user account may be associated with multiple user devices. For example, a single account may be used to access functionality on a mobile phone, a tablet, and a laptop. In this example, the system may determine which, if any, of the user devices associated with the account are currently in the possession of the owner of the account. In some embodiments, the process may be implemented to enforce usage settings on multiple user devices operated by the same user.

At 808, the process 800 comprises generating, based on the subset of active relationships, one or more usage settings to be enforced in relation to the one or more user devices. In some embodiments, the one or more usage settings comprises an indication of a geographic area. In some embodiments, such a geographic area is defined by one or more geographic coordinates. In some embodiments, such a geographic area is defined as a distance from a second user device. In some embodiments, the one or more usage settings comprise an indication of one or more functions of the user device to be disabled. The one or more usage settings may be generated to comprise a set of all non-conflicting usage settings for each of active relationships in the subset of active relationships as well as a set of resolved conflicting usage settings for each of active relationships in the subset of active relationships. A set of resolved conflicting usage settings may be generated from a set of all conflicting usage settings for each of active relationships in the subset of active relationships by resolving conflicts based on a priority for each of the subset of active relationships. For example, where two usage settings conflict, the usage setting associated with the relationship having the highest priority role will be adopted. In this example, the usage setting that is not associated with the relationship having the highest priority role may be adopted in part, but only to the extent that it does not conflict with the adopted usage setting.

At 810, the process 800 comprises enforcing the one or more usage settings with respect to the one or more user devices. In some embodiments, enforcing the one or more usage settings with respect to the one or more user devices comprises providing a notification to at least one second user device upon determining that the one or more user devices are outside of the geographic area. In some embodiments, enforcing the one or more usage settings with respect to the one or more user devices comprises providing at least a portion of the one or more usage settings to the user device, wherein the portion of the one or more usage settings are enforced by a mobile application installed upon the user device. In embodiments in which the one or more usage settings comprise an indication of one or more functions of the user device to be disabled, enforcing the one or more usage settings with respect to the one or more user devices comprises blocking network traffic directed to or from the user device associated with the one or more functions.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A computer-implemented method comprising:
receiving data indicating an activity of a first computing device;
in response to receiving the data indicating the activity of the first computing device, determining usage settings for the first computing device;
determining a location of a second computing device;
based on the usage settings for the first computing device and the location of the second computing device, determining a geographic area;
determining whether the first computing device is outside of the geographic area;
after determining whether the first computing device is outside of the geographic area, detecting network traffic to the first computing device from a third computing device or from the first computing device to the third computing device;
determining that the network traffic is not allowed according to the usage settings; and
based on determining that the network traffic is not allowed, blocking the network traffic.

2. The method of claim 1, wherein the data indicating the activity of the first computing device comprises data indicating a functionality activated on the computing device.

3. The method of claim 1, wherein the data indicating the activity of the first computing device comprises data indicating a current geographic location of the first computing device.

4. The method of claim 1, wherein the data indicating the activity of the first computing device is received based on the first computing device conducting the activity.

5. The method of claim 1, wherein:
the usage settings specify for the first computing device to be within the geographic area during a specified period of time, and
determining whether the first computing device is outside of the geographic area specified by the usage settings comprises determining whether the first computing device is outside of the geographic area during the specified period of time.

6. The method of claim 1, comprising:
determining a category or type of the network traffic to or from the first computing device,
wherein determining that the network traffic is not allowed is based on the category or the type of the network traffic.

7. The method of claim 1, wherein:
blocking the network traffic comprises blocking the network traffic for a specified period of time, and
the method comprises permitting the blocked network traffic to or from the first computing device after the specified period of time has elapsed.

8. The method of claim 1, wherein:
blocking the network traffic comprises blocking the network traffic for a specified period of time, and
the method comprises preventing the blocked network traffic from being output or received by the first computing device after the specified period of time has elapsed.

9. A system comprising:
a processor; and
a memory including instructions that, when executed with the processor, cause the system to perform the acts comprising:
receiving data indicating an activity of a first computing device;
in response to receiving the data indicating the activity of the first computing device, determining usage settings for the first computing device;
determining a location of a second computing device;
based on the usage settings for the first computing device and the location of the second computing device, determining a geographic area;
determining whether the first computing device is outside of the geographic area;
after determining whether the first computing device is outside of the geographic area, detecting network traffic to the first computing device from a third computing device or from the first computing device to the third computing device;
determining that the network traffic is not allowed according to the usage settings; and
based on determining that the network traffic is not allowed, blocking the network traffic.

10. The system of claim 9, wherein the data indicating the activity of the first computing device comprises data indicating a functionality activated on the first computing device.

11. The system of claim 9, wherein the data indicating the activity of the first computing device comprises data indicating a current geographic location of the first computing device.

12. The system of claim 9, wherein the data indicating the activity of the first computing device is received based on the first computing device conducting the activity.

13. The system of claim 9, wherein:
the usage settings specify for the first computing device to be within the geographic area during a specified period of time, and
determining whether the first computing device is outside of the geographic area specified by the usage settings comprises determining whether the first computing device is outside of the geographic area during the specified period of time.

14. The system of claim 9, wherein the acts comprise:
determining a category or type of the network traffic to or from the first computing device,
wherein determining that the network traffic is not allowed is based on the category or the type of the network traffic.

15. The system of claim 9, wherein:
blocking the network traffic comprises blocking the network traffic for a specified period of time, and
the acts comprise permitting the blocked network traffic to or from the first computing device after the specified period of time has elapsed.

16. The system of claim 9, wherein:
blocking the network traffic comprises blocking the network traffic for a specified period of time, and
the method comprises preventing the blocked network traffic from being output or received by the first computing device after the specified period of time has elapsed.

17. A computer-implemented method comprising:
receiving data indicating an activity of a computing device;
in response to receiving the data indicating the activity of the computing device, determining usage settings for the computing device;
determining a location of a second computing device;
based on the usage settings for the first computing device and the location of the second computing device, determining a geographic area;
determining whether the first computing device is outside of the geographic area;
after determining whether the first computing device is outside of the geographic area, detecting network traffic to the first computing device from a third computing device or from the first computing device to the third computing device;
determining that the network traffic is allowed according to the usage settings; and
based on determining that the network traffic is allowed, permitting the network traffic.

18. The method of claim 17, wherein the data indicating the activity of the first computing device comprises data indicating a functionality activated on the first computing device, comprises data indicating a current geographic location of the first computing device, or is received based on the first computing device conducting the activity.

* * * * *